Patented Sept. 17, 1929

1,728,258

UNITED STATES PATENT OFFICE

EDWARD S. SHEPERD, OF ST. JOSEPH, MISSOURI, ASSIGNOR TO ALBERT D. STEWART, OF ST. JOSEPH, MISSOURI

PROCESS FOR PREPARING CEREAL-STRAW FIBER FOR THE MANUFACTURE OF RELATIVELY-THICK FIBROUS SHEETS THEREFROM

No Drawing.     Application filed November 23, 1928.  Serial No. 321,520.

This invention relates to a process for preparing cereal straw fiber for the production therefrom of relatively thick fibrous sheets, and refers more particularly to a process involving a series of steps adapted to take raw cereal straw fibers such, for instance, as the residue remaining after the threshing of wheat, rye, barley and the like, and prepare it for use as stock in the manufacture of relatively thick fibrous sheets adapted particularly for use as insulating board. By relatively thick I mean a sheet approximately one-quarter to one-half inch in thickness.

I am aware that it has been proposed heretofore to manufacture relatively thick fibrous board out of raw cereal straw fibers as well as out of sugar cane fibers. As far as I am aware prior processes of manufacturing board from cereal straw fiber have not been entirely successful due to lack of knowledge of the correct manner of preparing the stock, while the problem involved in preparing sugar cane fiber was vastly different.

The process for accomplishing the steps, which comprise the basis of the present invention, has been developed after extensive research and careful experiment, and represents a practical and successful working process for converting raw cereal straw fibers into a stock suitable for the manufacture of relatively thick board.

The utility of the invention as well as objects and advantages thereof will be more particularly apparent from the following description.

In the preparation of the stock the cereal straw, which generally is in bale form, is broken up and subjected to a cutting action for the purpose of separating the mass of straw into individual straws and also for the purpose of shortening the length of the individual straws in order that in the cooking operation the straws may be more quickly and thoroughly agitated due to such shortness and be thereby more quickly, evenly and thoroughly cooked in order that the gums, or gum-like material naturally associated with the straw, may be loosened and readily removed. In this cutting operation the straw is individualized and the individual straws cut to a length of from three to five inches, more or less.

It should be noted at this point that, as a feature of the present invention, it has been found to be more or less essential in the preparation of cereal straw fiber for the purpose described to separate and remove all of the gums and gum-like materials naturally associated with and contained in the straw prior to the operation which produces the board.

Subsequent to the cutting operation the individualized straw is subjected to a cooking action. Prior to being charged to the cooker the straw may be subjected to a shower of water to remove foreign matter such as dirt, dust, et cetera, which also facilitates charging of the cooker by wetting down the straw.

As another feature of the present invention, the amount of water added to the cooker is carefully controlled and regulated for purposes to be hereinafter more particularly described. The water introduced may be at atmospheric temperature or may be at an elevated temperature. In practise I use about eight barrels of water to each ton of straw charged to the cooker. Only such an amount of water is introduced as can be absorbed by the straw, that is care should be taken not to put too much water into the straw as it retards and interferes with the subsequent drying operation. After being charged, the cooker may be connected with a source of live steam of, say from 25 to 55 lbs. pressure, more or less, at a temperature of approximately 275 to 300° F. The stock is agitated for from three to five hours, more or less, the time of cooking being regulated relative to the temperature and amount of water used to that necessary to loosen said gums and gum-like materials without excessive softening of the straw itself.

It is important at this point to note that in the cooking operation of the present invention no chemical is used for the purpose of softening the fibers, as is usual in the ordinary processing of straw fiber for the manufacture of thin paper. It also is important to note that too high a temperature carbonizes the natural gums and gum-like materials present in said straw and prevents separation of said gums from the straw fibers during subsequent processing, while too low a temperature merely prolongs the cooking time with danger of excessive softening of the fibers.

Straw cooked as above described would not be practical for regular paper making purposes for the reason that in the manufacture of a relatively thick building board, it is necessary that the fibers be of such character that they will not be soft and moisture absorbent; rather they should be relatively hard and tough (resilient). By careful regulation of the amount of water used, the temperature and duration of cooking, I am enabled to secure a fiber which is tougher, more resilient and harder than if the stock was cooked for a longer length of time under such conditions and in the presence of the usual chemicals employed in the ordinary processing of straw for paper work. In the ordinary paper mill practise a very fine soft fiber is the desired product of the cooking operation, because of the fact that it is desired to manufacture a relatively thin sheet having a very high density, and the extraction of the water is not such a problem, because of the thinness of the sheet, as is the case in the manufacture of a building board with a thickness of from one-quarter to one-half inch. The longer the length of time the fiber is cooked under the above noted conditions and the more the fibers are subjected to the action of any chemicals usually employed in cooking this fiber the softer the fibers will be, making them more susceptible to the holding of water. Whereas, in my process it is essential that I have a fiber which is not soft, which will absorb the minimum amount of moisture and will have great resiliency.

The formation of a sheet from straw stock is dependent upon the draining ability of the fibers, and stock is classed either as slow or free, referring to the draining characteristics. Example, sand would be slow while pebbles would be free. In the ordinary practise of cooking straw, chemicals, such as lime caustics and sulphur, are used which assist in disintegrating and softening the fibers. Such a process will produce fibers of a slimy gelatinous and glue-like nature which would be undesirable for use in the product I intend to manufacture.

After the straw has been cooked for the proper length of time and under the desired conditions it is dried to eliminate substantially all water, which may be accomplished by air drying or aerating in order to separate and dehydrate the straw. This drying step is important, since it is desirable that the straw be as dry as possible in the next step of the process. In the process of drying and dehydrating, the liquid is thoroughly drained off the fibers, carrying with it the greater part of the gums and gum-like materials loosened in the cooking operation.

As the next step in the process, these dried cooked fibers may be conveyed to a hammer mill shredder, or the like, especially designed to preserve the greatest possible length of fiber while reducing such fibers to the smallest cross section which can be obtained, it being desired to use long slim fibers in the manufacture of the building board heretofore described.

From the hammer mill shredder the dry stock may be passed over a magnetic device where all metal, such as pieces of baling wire, tie wires, etc., may be extracted. If such metal was not extracted it might very seriously impair the apparatus through which the straw subsequently passes.

The straw fibers may be then subjected to a tearing action by being passed through and between two metal disks, the faces of which may be corrugated or ridged, said disks being rotated at a speed of approximately 1200 R. P. M., each disk revolving in an opposite direction. The action effected by these metal disks is a tearing action rather than a grinding or cutting action, the object being to further reduce the cross sectional width of the individual fibers while preserving their greatest length. As the straw passes through these disks, it may be subjected to the action of steam introduced under about 100 pounds pressure for the purpose of aiding in the uniform reduction of the fibers and facilitating their feed through this mill. The steam in effect tends to blow the individual straw fibers through this mill. This part of the process may also be accomplished in a specially designed beating engine, if desirable.

From this latter mill, the straw may be conveyed to a vat where water is introduced, either heated or unheated, in sufficient quantity to make a stock of such consistency that it can be pumped to the washing and beating machines. The stock may be then subjected to the action of a beater preferably provided with a special type of beater adapted to give the greatest possible brushing action to the fibers to preserve their length, avoiding a cutting action which would shorten the length of said fibers and be injurious to the finished product. This beating further tends to break up and loosen any gum or gum-like materials remaining associated with the fibers.

As a final step in the preparation of the stock, it is then subjected to a very severe washing treatment carried on until the fibers are thoroughly cleansed, i. e., until the water in which the fibers are held in suspension is clear, or substantially clear, or in other words, free or substantially free from color, which color would result from any gums or gum-like materials still remaining in the stock.

Subsequent to the cleansing operation, the stock may be transferred to the usual stuff chests and conventional Jordan, or any other usual refining engine, where the fibers may be subjected to another brushing action and are made ready for the felting machine which produces the board.

The stock in aqueous suspension of the proper consistency, is then felted into a continuous fibrous sheet from approximately one-quarter to one-half inch in thickness. The water is removed, the sheet dried and severed into strips of desired length and width.

While I have described the invention in terms of successive steps, it is to be understood that the tearing and grinding steps may be combined if desired. The final cleansing operation to remove any gum or gum-like materials still in the stock may be interposed before the beater operation in some instances.

I claim as my invention:

1. A process which comprises the following steps: subjecting separated cereal straw fibers to a cooking action at an elevated temperature in the presence of water to loosen the gum-like material naturally associated with said fibers, regulating the amount of water used relative to the amount of fibers to prevent such an excess as would soften the fibers to the point where they would be slimy and slow, then drying said fibers to remove substantially all of said water and such gum-like material as will be carried off by said water, then subjecting said dried fibers to a tearing action regulated to reduce the cross sectional width of said individualized fibers while preserving their greatest possible length, thereafter incorporating water with said fibers and subjecting same to a beating action, regulating said beating action to give the greatest possible brushing action to said fibers while substantially preserving the length thereof, and subjecting said fibers to a cleansing action sufficient to remove substantially all gum-like material still remaining associated with said fiber.

2. A process which comprises the following steps: reducing cereal straw fibers to relatively short independent pieces, subjecting said separated cereal straw fibers to a cooking action at an elevated temperature in the presence of water to loosen the gum-like material naturally associated with said fibers, regulating the amount of water used relative to the amount of fibers to prevent such an excess as would soften the fibers to a point where they would be slimy and slow, then drying said fibers to remove substantially all of said water and such gum-like material as will be carried off by said water, then subjecting said dried fibers to a tearing action regulated to reduce the cross sectional width of said individualized fibers while preserving their greatest possible length, thereafter incoporating water with said fibers and subjecting same to a beating action, regulating said beating action to give the greatest possible brushing action to said fibers while substantially preserving the length thereof, and subjecting said fibers to a cleansing action sufficient to remove substantially all gum-like material still remaining associated with said fiber.

3. A process which comprises the following steps: subjecting separated cereal straw fibers to a cooking action at an elevated temperature in the presence of water to loosen the gum-like material naturally associated with said fibers, regulating the amount of water used relative to the amount of fibers to prevent such an excess as would soften the fibers to the point where they would be slimy and slow, then drying said fibers to remove substantially all of said water and such gum-like material as will be carried off by said water, then subjecting said dried fibers to a shredding action regulated to retain the greatest possible length of said fibers while reducing same to similar cross section to thereby produce long, relatively slim fibers, then subjecting said fibers to a tearing action to further reduce their cross sectional width while preserving their greatest length, thereafter incorporating water with said fibers and subjecting them to a beating action, regulating said beating action to give the greatest possible brushing action to said fibers while substantially preserving the length thereof, and subjecting the fibers to a cleansing action sufficient to remove all gum-like materials still remaining asociated with said fibers.

4. A process which comprises the following steps: subjecting separated cereal straw fibers to a cooking action at an elevated temperature in the presence of water to loosen the gum-like material naturally associated with said fibers, regulating the amount of water used relative to the amount of fibers to prevent such an excess as would soften the fibers to the point where they would be slimy and slow, then drying said fibers to remove substantially all of said water and such gum-like material as will be carried off by said water, then subjecting said dried fibers to a shredding action regulated to retain the greatest possible length of said fibers while reducing same to similar cross section to thereby produce long, relatively slim fibers, in then removing any metal contained in said fibers, then subjecting said fibers to a tearing action to further reduce their cross sectional width while preserving their greatest length, thereafter incorporating water with said fibers and subjecting them to a beating action, regulating said beating action to give the greatest possible brushing action to said fibers while substantially preserving the length thereof, and subjecting the fibers to a cleansing action sufficient to remove all gum-like materials still remaining associated with said fibers.

5. A process which comprises the following steps: subjecting separated cereal straw fibers to a cooking action at an elevated temperature in the presence of water to loosen the gum-like material naturally associated with said fibers, regulating the amount of water used relative to the amount of fibers to prevent such an excess as would soften the fibers to the point where they would be slimy and slow, then drying said fibers to remove substantially all of said water and such gum-like material as will be carried off by said water, then subjecting said dried fibers to a shredding action regulated to retain the greatest possible length of said fibers while reducing same to similar cross section to thereby produce long, relatively slim fibers, then subjecting said fibers to a tearing action to further reduce their cross sectional width while preserving their greatest length, then incorporating water with said fibers and subjecting them to a beating action regulated to give the greatest possible brushing action to said fibers while substantially preserving the length thereof, and finally subjecting said beaten fibers to a cleasing action sufficient to remove substantially all gum-like materials still remaining associated with said fibers.

6. A process which comprises the following steps: subjecting separated cereal straw fibers to a cooking action at an elevated temperature in the presence of water to loosen the gum-like material naturally associated with said fibers, regulating the amount of water used relative to the amount of fibers to prevent such an excess as would soften the fibers to the point where they would be slimy and slow, then drying said fibers to remove substantially all of said water and such gum-like material as will be carried off by said water, then subjecting said dried fibers to a tearing action regulated to reduce the cross sectional width of said individualized fibers while preserving their greatest possible length, thereafter incorporating water with said fibers and subjecting same to a beating action, regulating said beating action to give the greatest possible brushing action to said fibers while substantially preserving the length thereof, and subjecting said fibers to a cleansing action sufficient to remove substantially all gum-like material still remaining associated with said fiber and felting said stock into a relatively thick fibrous sheet.

In testimony whereof I affix my signature.

EDWARD S. SHEPERD.